(12) United States Patent
Hsu et al.

(10) Patent No.: US 9,461,483 B1
(45) Date of Patent: Oct. 4, 2016

(54) ELECTRICAL ENERGY STORAGE DEVICE WITH DAMPING FUNCTION

(71) Applicants: Fu-Tzu Hsu, Taipei (TW); Chieh-Sen Tu, New Taipei (TW)

(72) Inventors: Fu-Tzu Hsu, Taipei (TW); Chieh-Sen Tu, New Taipei (TW)

( * ) Notice: Subject to any disclaimer, the term of this patent is extended or adjusted under 35 U.S.C. 154(b) by 0 days.

(21) Appl. No.: 14/721,448

(22) Filed: May 26, 2015

(51) Int. Cl.
| | |
|---|---|
| *H02J 7/00* | (2006.01) |
| *H01G 11/04* | (2013.01) |
| *H01G 11/10* | (2013.01) |
| *H02J 7/34* | (2006.01) |

(52) U.S. Cl.
CPC ............. *H02J 7/0013* (2013.01); *H01G 11/04* (2013.01); *H01G 11/10* (2013.01); *H02J 7/345* (2013.01)

(58) Field of Classification Search
CPC .. H02J 7/345; H02M 3/07; H02M 2003/077; H01G 11/00; H01G 11/02; H01G 11/04; H01G 11/08; H01G 11/10
USPC ................ 320/166, 167, 116, 118, 119, 103; 361/271, 328
See application file for complete search history.

(56) References Cited

U.S. PATENT DOCUMENTS

2013/0200860 A1* 8/2013 Takeda .................. H02J 7/0024
320/167

OTHER PUBLICATIONS

Nesscap Ultracapacitors, Products: Single Cell, ELDC/Pseudocapacitors, Confirmed dates on Jul. 2014 and Jan. 2015 respectively, www.nesscap.com.*
Nesscap Ultracapacitors, Products: Single Cell, ELDC/Pseudocapacitors, Confirmed dates on Jul. 2014 and Jan. 2015 respectively, www.nesscap.com.*

* cited by examiner

*Primary Examiner* — Richard Isla Rodas
*Assistant Examiner* — Michael Dibenedetto
(74) *Attorney, Agent, or Firm* — WPAT, PC; Justin King; Jonathan Chiang

(57) ABSTRACT

An electrical energy storage device with damping function is a capacitor-cell battery formed of a plurality of capacitor cells connected in either series or parallel. Each of the capacitor cells includes a supercapacitor and a pseudocapacitor. The supercapacitor is a non-polarized capacitor internally having a separator, and the pseudocapacitor is a polarized electrochemical capacitor. The supercapacitor and the pseudocapacitor are electrically connected in parallel. The supercapacitor has a capacity close to or equal to that of the pseudocapacitor. When charging the capacitor-cell battery, the supercapacitor in every capacitor cell produces a polarization effect, so that electrical energy is charged thereinto as a result of voltage. And, due to a potential balance between the supercapacitor and the pseudocapacitor, the electrical energy charged into the supercapacitor is rapidly transformed into electric current that flows into and is stored in the pseudocapacitor.

4 Claims, 5 Drawing Sheets

ELECTRICAL ENERGY STORAGE DEVICE WITH DAMPING FUNCTION

FIELD OF THE INVENTION

The present invention relates to an electrical energy storage device with damping function, and more particularly, to a capacitor-cell battery formed of a plurality of capacitor cells connected in either series or parallel.

BACKGROUND OF THE INVENTION

A cell is a basic unit constituting a battery also an electrical energy storage device. Among others, lithium-ion batteries are the currently most popular battery devices. However, the lithium-ion battery is not a very stable device and there are risks and limits in using it. For example, the lithium-ion battery in use can not be overcharged or deeply discharged; otherwise the battery would become damaged or unusable. Further, the lithium-ion battery should not be charged at an environmental temperature higher than the temperature range preset for it. The lithium-ion battery has different discharge curves, discharge voltages and discharge time when being discharged at different temperatures.

While a capacitor has the property of storing electrical energy temporarily, it could not be used as an electrical energy storage device. FIG. 1A shows a non-polarized capacitor, which is usually used in an electrical coupling circuit; FIG. 1B shows a polarized capacitor, which is usually used in circuits for filtering and buffering; FIG. 1C shows a polarized supercapacitor, which is usually used in circuits for temporary electrical energy storage, but it is not really an electrical energy storage device; FIG. 1D shows a non-polarized supercapacitor, which can be polarized in circuits and is usually used in circuits for temporary electrical energy storage, but it is not really an electrical energy storage device; and FIG. 1E shows a polarized pseudocapacitor, which is usually used in circuits as a filter for large direct-current (DC) transmission. None of the above five types of capacitors can be really used as a device for storing electrical energy and they do not provide the function of a battery or a rechargeable battery.

The lithium-ion battery is characterized by its high specific energy, which also results in its high internal resistance, or high direct-current resistance (DCR), and is therefore not suitable for fast charge and fast discharge. Some people connect the lithium-ion battery and the pseudocapacitor in parallel for use. The pseudocapacitor can have a large capacity nearly as high as a battery's. The pseudocapacitor has the property of isolating DC, which causes a certain degree of difficulty in charging it. When the lithium-ion battery and the pseudocapacitor are connected in parallel for use, the circuit so formed is subject to the risk of instantaneous short circuit when being charged by high voltage and therefore has poor operational stability.

There are also people who connect the lithium-ion battery and the supercapacitor in parallel for use. The supercapacitor tends to produce a strong electrostatic field, i.e. a polarization effect, when it is being charged. Further, as a property of the capacitor, the charging of the capacitor is impeded by its capacitive reactance to thereby cause rising potential and temperature thereof, creating an environmental temperature that is disadvantageous to the lithium-ion battery. That is, neither the parallelly connected lithium-ion battery and pseudocapacitor nor the parallelly connected lithium-ion battery and supercapacitor could eliminate the problem of poor operational stability of the lithium-ion battery.

SUMMARY OF THE INVENTION

A primary object of the present invention is to provide an electrical energy storage device with damping function, which is a capacitor-cell battery formed of a plurality of capacitor cells connected in either series or parallel and can be fast charged and discharged with a properly matched charger.

Another object of the present invention is to provide an electrical energy storage device with damping function, which has relatively low internal resistance or direct-current resistance (DCR) and high operational stability without the risk of instantaneous short circuit when being charged or discharged.

To achieve the above and other objects, the electrical energy storage device with damping function provided according to the present invention is a capacitor-cell battery formed of a plurality of capacitor cells connected in either series or parallel. Each of the capacitor cells includes a supercapacitor and a pseudocapacitor. The supercapacitor is a non-polarized capacitor internally having a separator, and the pseudocapacitor is a polarized electrochemical capacitor. The supercapacitor and the pseudocapacitor are electrically connected in parallel. The supercapacitor has a capacity close to or equal to that of the pseudocapacitor. When charging the capacitor-cell battery, the supercapacitor in every capacitor cell produces a polarization effect, so that electrical energy is charged thereinto as a result of voltage. And, due to a potential balance between the supercapacitor and the pseudocapacitor, the electrical energy charged into the supercapacitor is rapidly transformed into electric current that flows into and is stored in the pseudocapacitor. This condition is also referred to as a damping effect.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
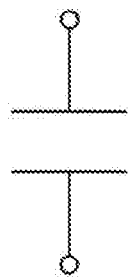
FIG. 1A shows a non-polarized capacitor.
Figure 1B:
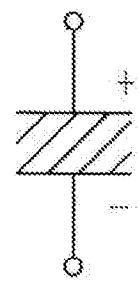
FIG. 1B shows a polarized capacitor.
Figure 1C:
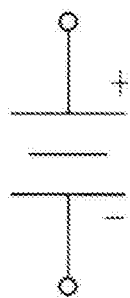
FIG. 1C shows a polarized supercapacitor.
Figure 1D:
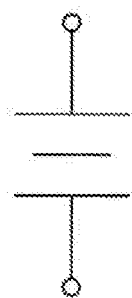
FIG. 1D shows a non-polarized supercapacitor.
Figure 1E:
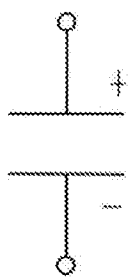
FIG. 1E shows a polarized pseudocapacitor.
Figure 2:
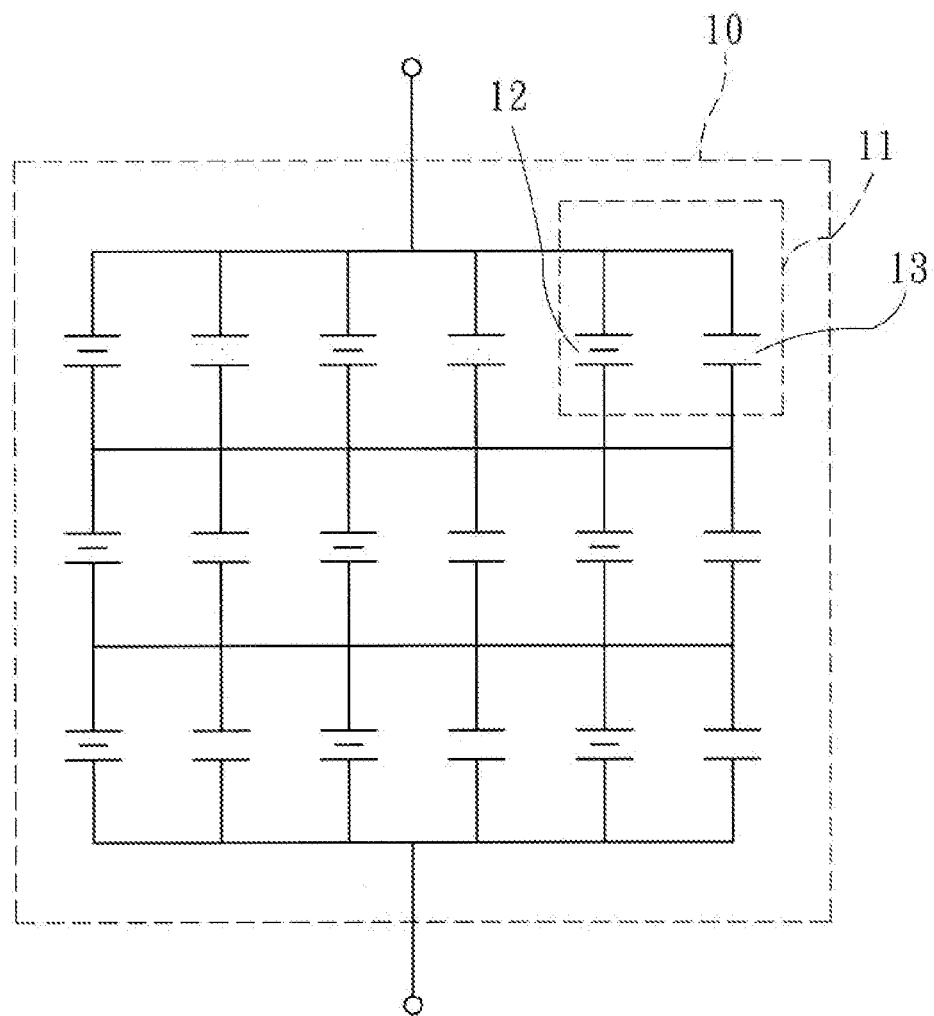
FIG. 2 shows the structure of an electrical energy storage device with damping function according to an embodiment of the present invention.
Figure 3:
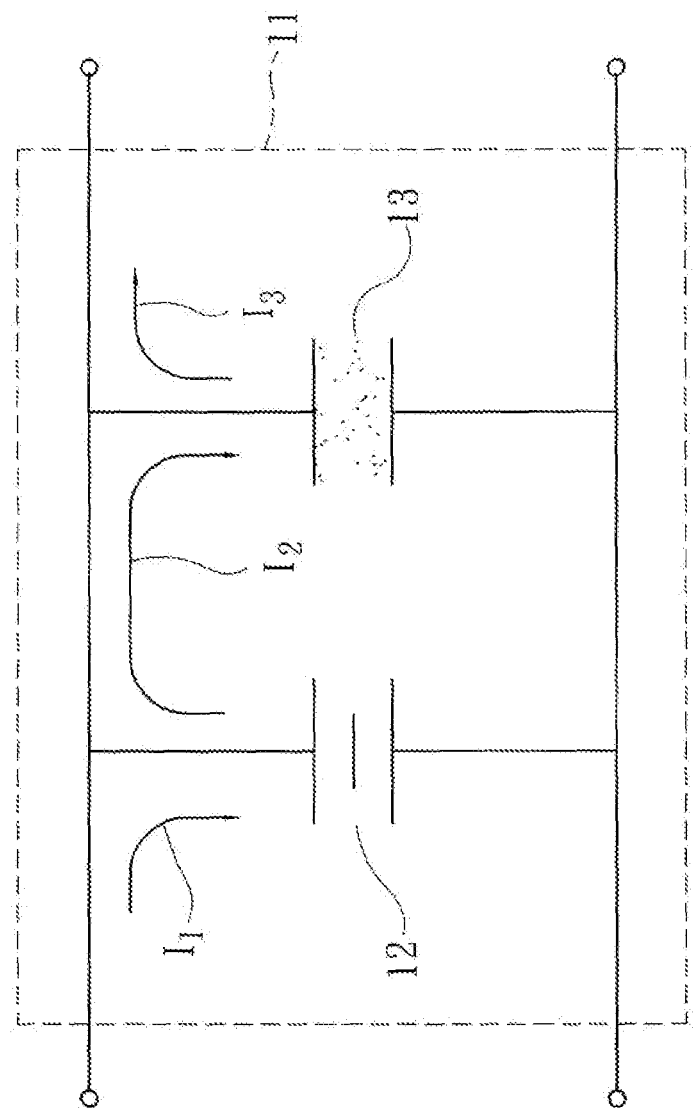
FIG. 3 is a structural view of one of the capacitor cells forming the embodiment of the present invention shown in FIG. 2.

Please refer to FIGS. 2 and 3. An electrical energy storage device with damping function according to an embodiment of the present invention is a capacitor-cell battery 10 formed of a plurality of capacitor cells 11 connected in either series or parallel. For the purpose of conciseness, the present invention is also briefly referred to as the electrical energy storage device herein. The electrical energy storage device according to the present invention must be charged with a charging device having damping function, such as the damping charging device disclosed in Taiwan New Utility Model Patent No. M484854.

Each of the capacitor cells 11 in the capacitor-cell battery 10 includes a supercapacitor 12 and a pseudocapacitor 13. The supercapacitor 12 is a non-polarized capacitor internally having a separator; and the pseudocapacitor 13 is a polarized electrochemical capacitor. The supercapacitor 12 and the pseudocapacitor 13 are electrically connected in parallel while they are invisibly physically connected in series (polarized). The supercapacitor 12 has a capacity close to or equal to that of the pseudocapacitor 13. In practical implementation, the supercapacitor 12 preferably has a capacity about from 90 to 110% of the capacity of the pseudocapacitor 13. When charging the capacitor-cell battery 10, the supercapacitor 12 in every capacitor cell 11 will produce a polarization effect, so that electrical energy is charged thereinto as a result of voltage. Due to a potential balance between the supercapacitor and the pseudocapacitor, the electrical energy charged into the supercapacitor 12 is rapidly transformed into electric current that flows into and is stored in the pseudocapacitor 13, bringing the electric potential of the supercapacitor and of the pseudocapacitor to gradually get close to each other and finally become the same. This condition is referred to as a damping effect for resonance transition.

Figure 4:
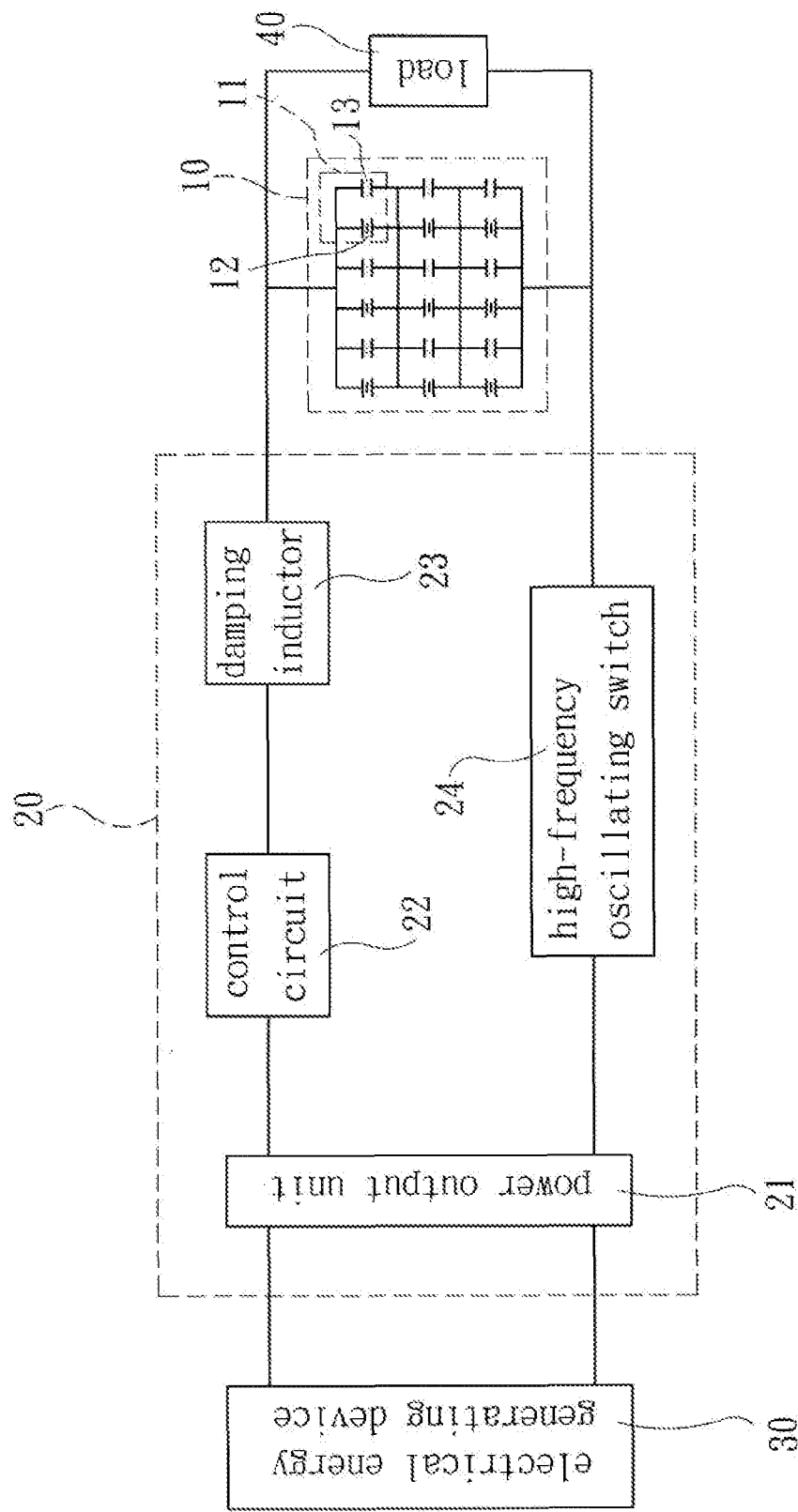
FIG. 4 is a block diagram showing the present invention is charged with a damping charging device.

Please refer to FIG. 4. When charging the capacitor-cell battery 10 with a charging device having damping function, which is also briefly referred to as the charging device and generally denoted by reference numeral 20 herein, since the supercapacitors 12 in the capacitor cells 11 are able to produce a very strong polarization effect, electrical energy is caused to be charged into the supercapacitors 12 of the capacitor cells 11. The electrical energy charged into the supercapacitors 12 is rapidly transformed into electric current that is stored in the pseudocapacitors 13. The charging device 20 includes a power output unit 21, a control circuit 22, a damping inductor 23, and a high-frequency oscillating switch 24. The power output unit 21 is connectable to an electrical energy generating device 30 and is used to increase or decrease a voltage of the electrical energy output by the electrical energy generating device 30 and then outputs a voltage-regulated electrical power. The capacitor-cell battery 10 is connected at an anode to the damping inductor 23 and at a cathode to the high-frequency oscillating switch 24. The electrical energy generating device 30 can be a renewable energy generator or a grid power source. When the high-frequency oscillating switch 24 of the charging device 20 is actuated, the damping inductor 23 is caused to store and release electrical energy alternately at high frequency. When the high-frequency oscillating switch 24 is ON, the damping inductor 23 is caused to store electrical energy. On the other hand, when the high-frequency oscillating switch 24 is OFF, the damping inductor 23 is caused to release the stored electrical energy to charge the capacitor-cell battery 10. Therefore, the electrical energy released from the damping inductor 23 is electrical energy with frequency response.

After being charged with electrical energy as a result of voltage, the supercapacitors 12 will have increased electric potential. At this point, the electrical energy charged into the supercapacitors 12 is naturally transformed into electric current and output to flow into and be stored in the pseudocapacitors 13. After the electrical energy charged into the supercapacitors 12 flows into the pseudocapacitors 13, the electric potential of the supercapacitors 12 naturally decreases to facilitate charging next time. Since the electrical energy charged into the capacitor-cell battery 10 with the charging device 20 is electrical energy with frequency response, the electric potential of the supercapacitors 12 is brought to increase and decrease alternately at high frequency.

As can be seen in FIG. 3, when the charging device 20 charges the electrical energy with frequency response into the capacitor cells 11, the electrical energy flows along a charge path I1, so that electrical energy is charged into the supercapacitors 12 as a result of voltage. When the high-frequency oscillating switch 24 is instantaneously turned off, i.e. the charging device 20 instantaneously stops charging the capacitor-stack battery 10, the electrical energy charged into the supercapacitors 12 will be rapidly charged along a storage path I2 into the pseudocapacitors 13 as electric current. The condition in which the supercapacitors 12 rapidly transform the polarized voltage into electric current for flowing into and storing in the pseudocapacitors 13 is a resonance transition process, or a damping effect, that brings the capacitor cells 11 to have an internal resistance (DCR) close to zero. In other words, in the capacitor cells 11, the electrical energy charged as a result of voltage is transformed into electric current for storage without causing any energy loss. More specifically, the capacitor cells 11 are transformed from the physical phenomenon of an electrostatic field into an electrochemical field phenomenon.

When the capacitor-cell battery 10 discharges for a load 40 to work, the electrical energy is released from the pseudocapacitor 13 of every capacitor cell 11 to flow along a discharge path I3. Since the charge path I1 and the discharge path I3 for every capacitor cell 11 are two different paths, charge and discharge of the capacitor cell 11 can be performed at the same time.

Figure 5:
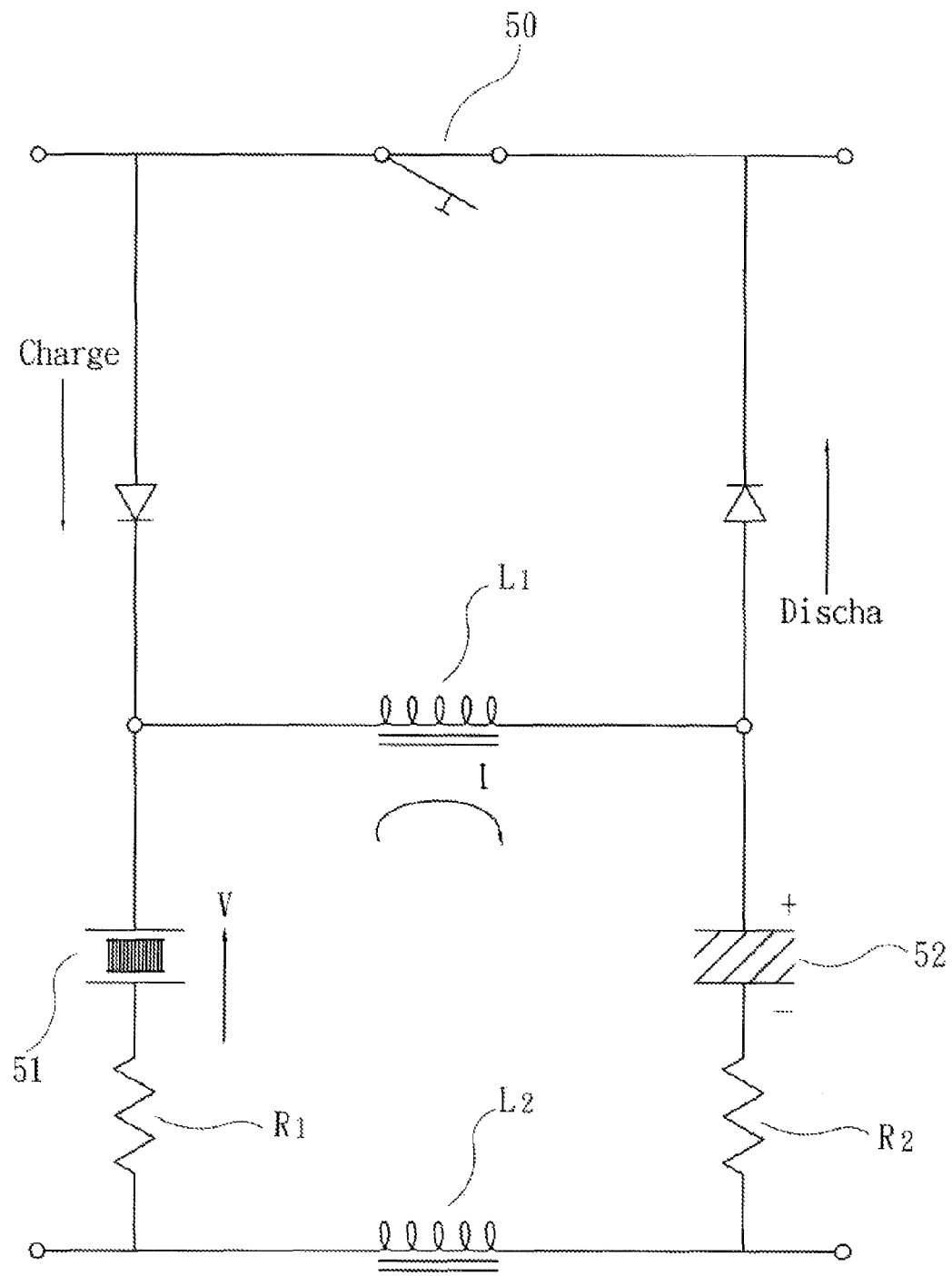
FIG. 5 is an equivalent circuit diagram of the present invention.

FIG. 5 is an equivalent circuit diagram of the capacitor-cell battery according to the present invention. As shown, the capacitor-cell battery includes an automatic serial/parallel connection switch 50, an electrically serially connected supercapacitor 51, an electrically parallelly connected pseudocapacitor 52, a serially connected inductor L1, and a parallelly connected inductor L2. When the automatic serial/parallel connection switch 50 is switched to enable serial connection, electrical energy can be charged into the electrically serially connected supercapacitor 51, so that the supercapacitor 51 has an increased electric potential and is in a charged state. Then, the electrical energy charged into the electrically serially connected supercapacitor 51 will be rapidly transformed into electric current, which flows into and is stored in the electrically parallelly connected pseudocapacitor 52. On the other hand, when the automatic serial/parallel connection switch 50 is switched to enable parallel connection, the electrical energy stored in the electrically parallelly connected pseudocapacitor 52 will be released. In FIG. 5, resistance R1, R2 are internal resistance in the circuit.

In summary, the capacitor-cell battery 10 of the present invention has the following features:

(1) Simple circuit structure: When the capacitor-cell battery 10 of the present invention is charged, the supercapacitor 12 enables a physical dielectric polarization effect; and when the capacitor-cell battery 10 of the present invention discharges, the pseudocapacitor 13 enables a chemical oxidation-reduction effect.

(2) Suitable for high-power electricity storage: The energy storage capacity of the capacitor-cell battery 10 of the present invention is determined by the quantity of the capacitor cells 11 connected in either series or parallel. Therefore, the capacitor-cell battery 10 can be used to store high-power electrical energy as long as it is assembled from sufficient number of capacitor cells 11.

(3) Storing electrical energy with super-high frequency response to produce a damping effect for resonance transition. Since the charging device 20 for use with the present invention can release electrical energy with frequency response, the capacitor-cell battery 10 according to the present invention can internally produce a damping effect for resonance transition, allowing smooth charging and electrical energy storage as well as increased charging efficiency.

(4) Different charge path and discharge path. The capacitor-cell battery 10 of the present invention is charged and discharged via two different paths, namely, a charge path I1 and a discharge path I3, and is therefore, suitable for fast charge and fast discharge.

(5) High operational stability. Due to the resonance in every capacitor cell, the capacitor cells have very low internal resistance. Therefore, the capacitor-cell battery 10 has high operational stability without the risk of rising temperature, even if there is any instantaneous short circuit in the process of charging or discharging.

(6) Reduced volume. The capacitor-cell battery of the present invention can be manufactured through a semiconductor process to have a reduced volume suitable for use as an electrical energy storage device for 3C (communication, computer and consumer electronics) products. The capacitor-cell battery can be made of, for example, graphene or a magnetoresistance material. Further, the battery product manufactured according to the technique disclosed in the present invention can have different energy density and capacity by using different electrode materials and electrode geometrical shapes.

In conclusion, when the capacitor-cell battery 10 of the present invention is charged with the above-mentioned damping charging device 20, since the supercapacitors 12 will produce very strong electrostatic field polarization and the polarized pseudocapacitors 13 provides very high energy storage capacity, the capacitor-cell battery 10 can be used to store electrical energy with super-high frequency response and provides a damping effect, enabling fast charge and high operational stability.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An electrical energy storage device with damping function, comprising:
   a capacitor-cell battery formed of a plurality of capacitor cells connected in either series or parallel, each of the capacitor cells comprising:
      a supercapacitor, comprising a non-polarized capacitor internally having a separator, wherein when charging the capacitor-cell battery, the supercapacitor in every capacitor cell produces a polarization effect, so that electrical energy is charged therein as a result of voltage; and
      a pseudocapacitor, comprising a polarized electrochemical capacitor, wherein the supercapacitor having a capacity from 90 to 110% of the capacity of the pseudocapacitor, the supercapacitor and the pseudocapacitor being electrically connected in parallel, and each capacitor cell is connected in series;
   wherein, due to a potential balance between the supercapacitor and the pseudocapacitor, the electrical energy charged into the supercapacitor is rapidly transformed into electric current that flows into and is stored in the pseudocapacitor, forming a damping effect for resonance transition; and
   wherein, electrical energy is charged into the supercapacitor from a first path, and electrical energy stored in the pseudocapacitor is released to a second path.

2. The electrical energy storage device with damping function as claimed in claim 1, wherein the supercapacitor is an electric double-layer capacitor (EDLC) capable of producing a strong electrostatic field in the process of being charged.

3. The electrical energy storage device with damping function as claimed in claim 1, wherein the pseudocapacitor is an electrochemical capacitor made of a metal oxide capable of storing a burst electric current in the process of being charged.

4. An electrical energy storage device with damping function, comprising:
   a charging device, comprising:
      a control circuit;
      a damping inductor; and
      a high-frequency oscillating switch, wherein when the high-frequency oscillating switch is set to an on position, the damping inductor stores electrical energy, and when the high-frequency oscillating switch is set to an off position, the damping inductor releases electrical energy to charge a capacitor-cell battery; and
   the capacitor-cell battery, comprising a plurality of capacitor cells connected in either series or parallel, each of the capacitor cells comprising:
      a supercapacitor, comprising a non-polarized capacitor internally having a separator, wherein when charging the capacitor-cell battery, the supercapacitor in every capacitor cell produces a polarization effect, so that electrical energy is charged therein as a result of voltage; and
      a pseudocapacitor, comprising a polarized electrochemical capacitor, wherein the supercapacitor having a capacity from 90 to 110% of the capacity of the pseudocapacitor, the supercapacitor and the pseudocapacitor being electrically connected in parallel, and each capacitor cell is connected in series;
   wherein, due to a potential balance between the supercapacitor and the pseudocapacitor, the electrical energy charged into the supercapacitor is rapidly transformed into electric current that flows into and is stored in the pseudocapacitor, forming a damping effect for resonance transition;
   wherein, when the charging device is configured to charge the capacitor-cell battery, the charging device charges the supercapacitor with electrical energy; and when the charging device is configured to stop charging the capacitor-cell battery, the electrical energy in the supercapacitors rapidly charges the pseudocapacitor; and
   wherein, electrical energy is charged into the supercapacitor from a first path, and electrical energy stored in the pseudocapacitor is released to a second path.

* * * * *